US012508449B2

(12) United States Patent
Hung et al.

(10) Patent No.: US 12,508,449 B2
(45) Date of Patent: Dec. 30, 2025

(54) ROPE GRAB

(71) Applicant: YOKE INDUSTRIAL CORP., Taichung (TW)

(72) Inventors: Wei-Chieh Hung, Taichung (TW); Ya-Chun Cheng, Changhua County (TW)

(73) Assignee: YOKE INDUSTRIAL CORP., Taichung (TW)

( * ) Notice: Subject to any disclaimer, the term of this patent is extended or adjusted under 35 U.S.C. 154(b) by 45 days.

(21) Appl. No.: 18/773,487

(22) Filed: Jul. 15, 2024

(65) Prior Publication Data

US 2025/0312625 A1 Oct. 9, 2025

(30) Foreign Application Priority Data

Apr. 3, 2024 (TW) ................................ 113112754

(51) Int. Cl.
*A62B 1/14* (2006.01)

(52) U.S. Cl.
CPC .................................... *A62B 1/14* (2013.01)

(58) Field of Classification Search
CPC ....................................................... A62B 1/14
See application file for complete search history.

(56) References Cited

U.S. PATENT DOCUMENTS 4,846,075 A * 7/1989 Tupper .................. F16G 11/105 104/211
5,156,240 A * 10/1992 Ostrobrod ................ A62B 1/14 188/65.1
5,924,522 A * 7/1999 Ostrobrod ................ A62B 1/14 182/5
6,056,086 A * 5/2000 Gortan ..................... A62B 1/14 182/234
8,348,016 B2 * 1/2013 Lewis ...................... A62B 1/14 182/5
2003/0051944 A1 * 3/2003 Shea ........................ A62B 1/14 182/5

(Continued)

FOREIGN PATENT DOCUMENTS

EP 2877251 B1 1/2020

OTHER PUBLICATIONS

Search Report for EP241885078, Issued on Dec. 18, 2024, Total of 2 pages.

*Primary Examiner* — David M Upchurch
(74) *Attorney, Agent, or Firm* — Apex Juris, pllc; Cera Oh

(57) ABSTRACT

A rope grab includes a housing. A rope seat portion having a rope groove and an accommodating portion are disposed on the housing. A cam member, a locking member that could return after rotation, and a linkage member are pivotally connected to the accommodating portion. The cam member clamps a rope placed in the rope groove. A limiting member is disposed in the accommodating portion and could move back and forth towards the rope seat portion. The limiting member has a limiting wheel for guiding the rope. The locking member has a first arm for restricting the limiting member from moving backward and a second arm. The linkage member has an abutting end and a safety harness attachment portion. The linkage member could selectively abut against the cam member via the abutting end or pivot to a position to move the second arm.

10 Claims, 10 Drawing Sheets

(56) References Cited

U.S. PATENT DOCUMENTS

| | | | | |
|---|---|---|---|---|
| 2004/0129494 | A1* | 7/2004 | Cherpitel | A62B 1/14<br>182/5 |
| 2014/0020983 | A1* | 1/2014 | Casebolt | A62B 35/0081<br>182/241 |
| 2014/0020988 | A1* | 1/2014 | Casebolt | A62B 35/04<br>188/65.1 |
| 2017/0260762 | A1* | 9/2017 | Ostrobrod | E04G 21/3204 |
| 2019/0099626 | A1* | 4/2019 | Codega | A62B 1/14 |

* cited by examiner

ROPE GRAB

BACKGROUND OF THE INVENTION

Technical Field

The present invention relates generally to a safety device; and more particularly to a rope grab for securing a rope.

Description of Related Art

The existing rope grab is adapted to be connected to a safety harness. A housing of the rope grab has a rope placement opening, wherein the housing has two opposite sides corresponding to the rope placement opening. A rope groove is disposed on the one side of the housing. A cam is pivotally connected to another side of the housing, and a limiting wheel is fixedly disposed on the another side of the housing. When the rope grab is used, a rope is placed through the rope placement opening into the rope groove. The cam unidirectionally clamps the rope against a wall surface of the rope groove, and the limiting wheel guides the rope to slide along the rope groove by contacting the rope.

Although a user could secure the safety harness to the rope using the existing rope grab, and the rope grab could move unidirectionally along the rope, thereby providing safety protection for the user. However, the limiting wheel of the existing rope grab is fixed on the housing and extends into the rope placement opening. This inevitably obstructs the rope from being quickly placed into the rope groove through the rope placement opening, thereby preventing the rope grab from being quickly disposed on the rope.

BRIEF SUMMARY OF THE INVENTION

In view of the above, the primary objective of the present invention is to provide a rope grab having a limiting wheel, wherein the limiting wheel could move back and forth toward a direction of a rope placement opening. A safety device is disposed to prevent accidental retraction of the limiting wheel. Therefore, the rope grab could be quickly set on a rope.

The present invention provides a rope grab including a housing, a cam member, a limiting member, a locking member, and a linkage member. The housing has a rope seat portion and an accommodating portion, wherein the rope seat portion has a rope groove for accommodating a rope. The rope groove penetrates two opposite sides of the housing and has a wall surface. The cam member is pivotally connected to the accommodating portion, wherein the cam member pivots between a first position and a second position. The cam member has a cam portion. When the cam member is located in the first position, the cam member clamps the rope together with the wall surface. The limiting member is disposed in the accommodating portion and is movable between a third position and a fourth position. The limiting member has a limiting wheel. When the limiting member is located in the third position, the limiting wheel is nearer to the rope groove compared to when the limiting member is located in the fourth position, so that the limiting wheel restricts the rope in the rope groove.

The locking member is pivotally connected to the accommodating portion, wherein the locking member pivots between a fifth position and a sixth position. The locking member has a first arm and a second arm. When the locking member is located in the fifth position, the first arm restricts the limiting member from moving from the third position to the fourth position. A locking member spring is connected between the locking member and the accommodating portion, wherein the locking member spring is adapted to return the locking member to the fifth position. The linkage member is pivotally connected to the accommodating portion, wherein the linkage member pivots between a seventh position and an eighth position. The linkage member has an abutting end and a safety harness attachment portion. When the linkage member is located in the seventh position, the abutting end abuts against the cam member that restricts the cam member in the first position. When the linkage member is located in the eighth position, the linkage member moves the second arm to move the first arm from a position that restricts the limiting member to the sixth position.

When using the present invention, the safety harness attachment portion of the linkage member could be secured to a safety harness worn by a user. When the rope is placed in the rope groove of the housing and used for tree climbing or attaching to a stand, the rope is restricted between the wall surface and the limiting wheel. The cam member could clamp and secure the rope with the wall surface. The rope groove allows the rope to slide in one direction. As the rope slides along the rope groove, the guiding action of the limiting wheel, which is rotatable, allows the rope to slide more smoothly.

The advantage of the present invention is that, since the limiting member is restricted by the locking member, the limiting member does not retract to the fourth position arbitrarily. This ensures that the rope, when restricted between the wall surface of the rope groove and the limiting wheel and guided by the limiting wheel, remains in contact with and restricted by the limiting wheel, preventing the rope from accidentally coming out of the rope groove. When the housing of the present invention is set on the rope, rotating the linkage member to the eighth position allows the first arm of the locking member to pivot from the position that restricts the limiting member to the sixth position. At this point, the limiting member could be moved to the fourth position, preventing the limiting wheel from obstructing the rope from entering the rope groove between the rope seat portion and the accommodating portion. This allows the rope grab to be quickly set on the rope.

BRIEF DESCRIPTION OF THE SEVERAL VIEWS OF THE DRAWINGS

The present invention would be best understood by referring to the following detailed description of some illustrative embodiments in conjunction with the accompanying drawings, in which.

DETAILED DESCRIPTION OF THE INVENTION

Figure 1:
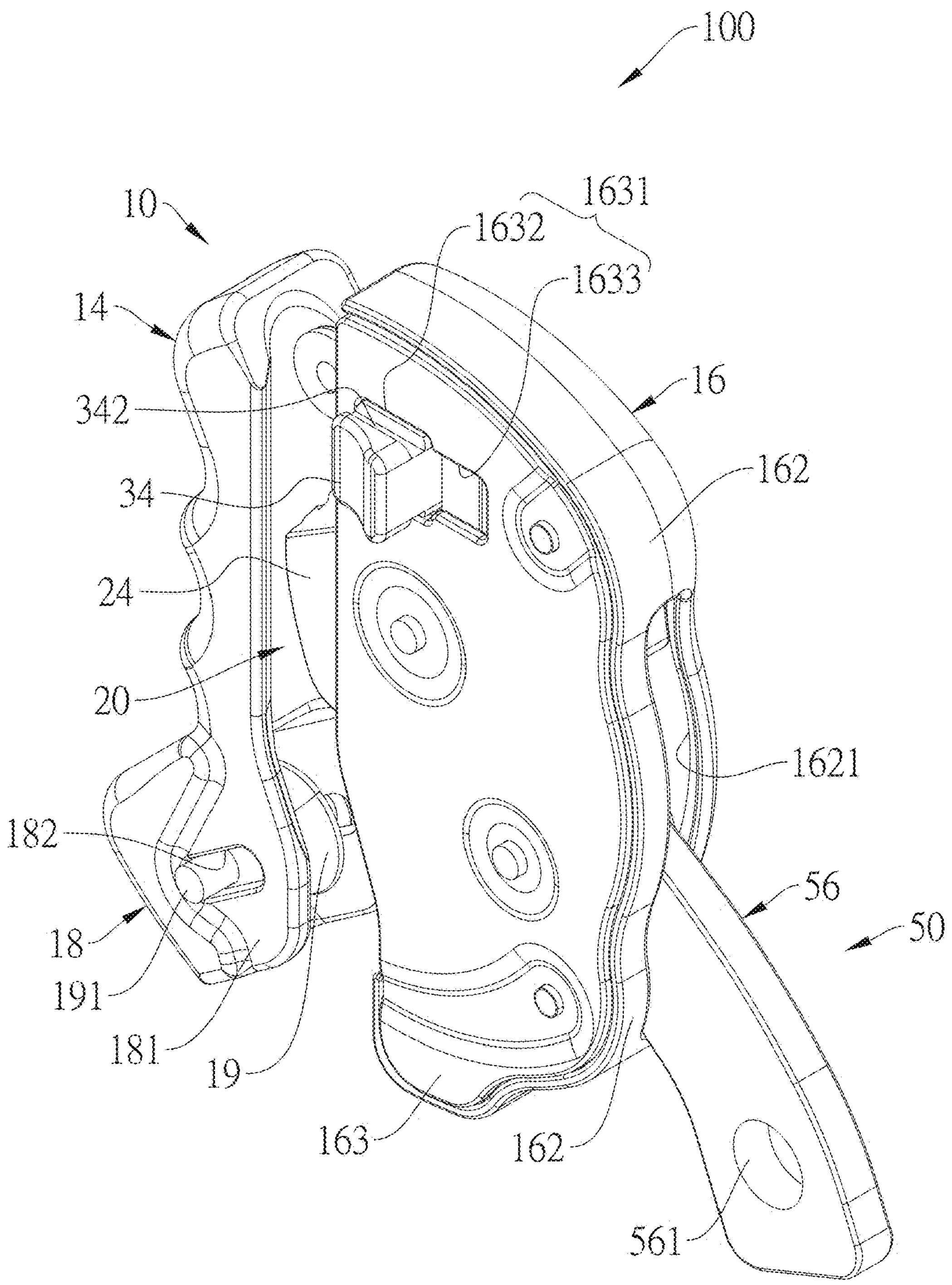
FIG. 1 is a perspective view of the rope grab according to an embodiment of the present invention.

A rope grab 100 according to an embodiment of the present invention is illustrated in FIG. 1 to FIG. 6 and includes a housing 10, a cam member 20, a limiting member 30, a locking member 40, and a linkage member 50, wherein the cam member 20, the limiting member 30, the locking member 40, and the linkage member 50 are respectively connected to the housing 10.

Figure 2:
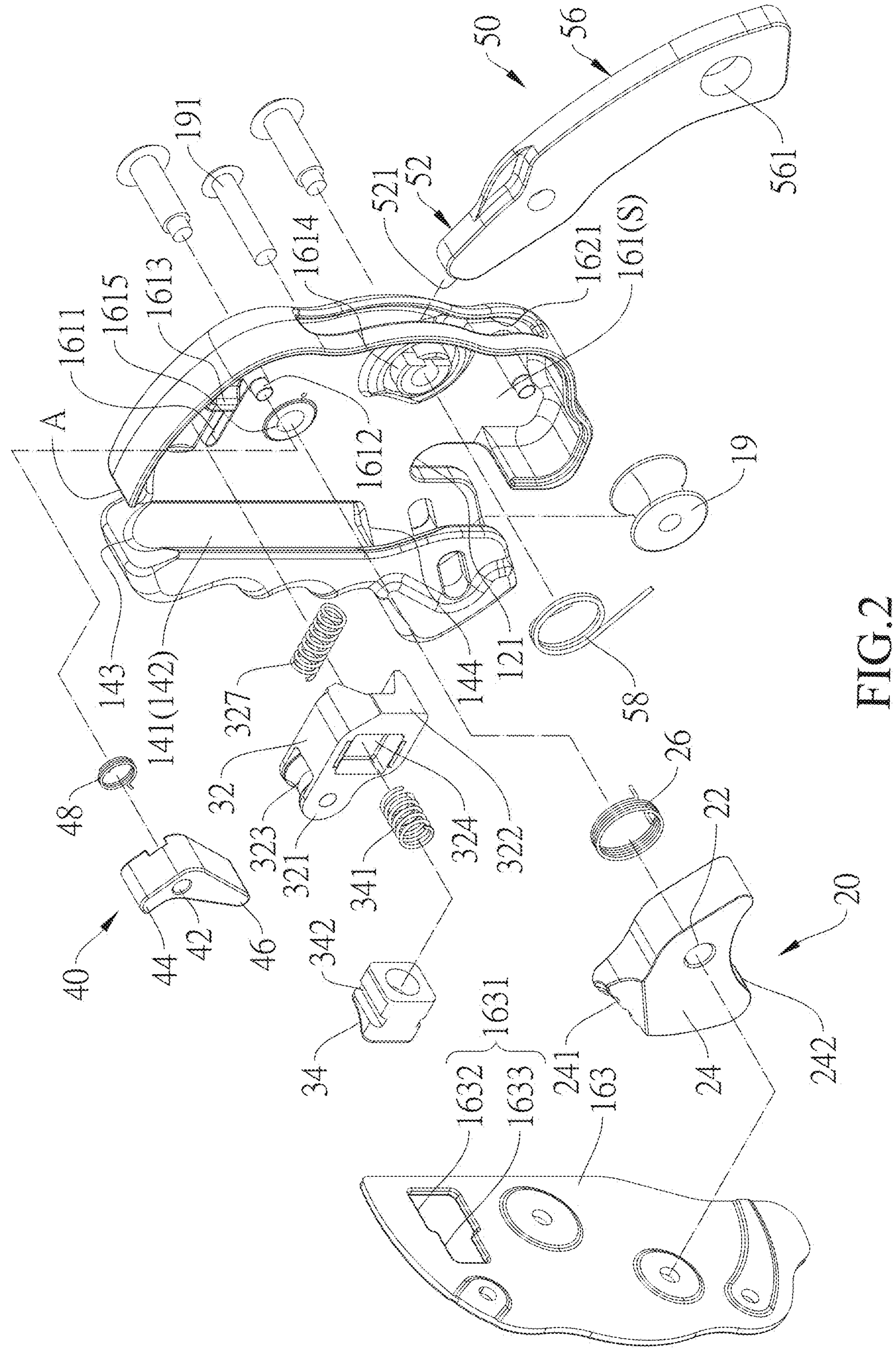
FIG. 2 is an exploded view of the rope grab according to the embodiment of the present invention.
Figure 3:
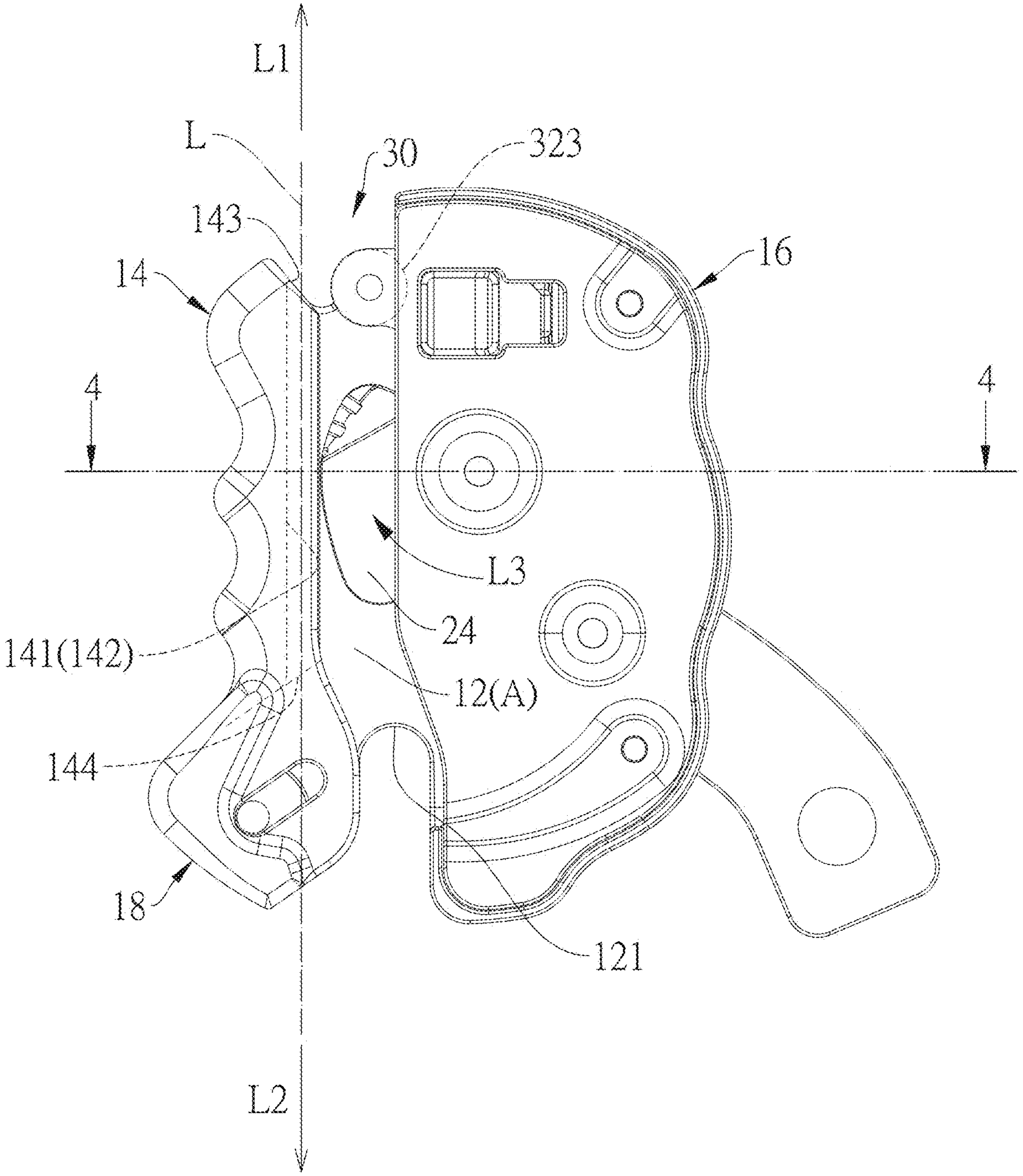
FIG. 3 is a top view of the rope grab according to the embodiment of the present invention.
Figure 4:
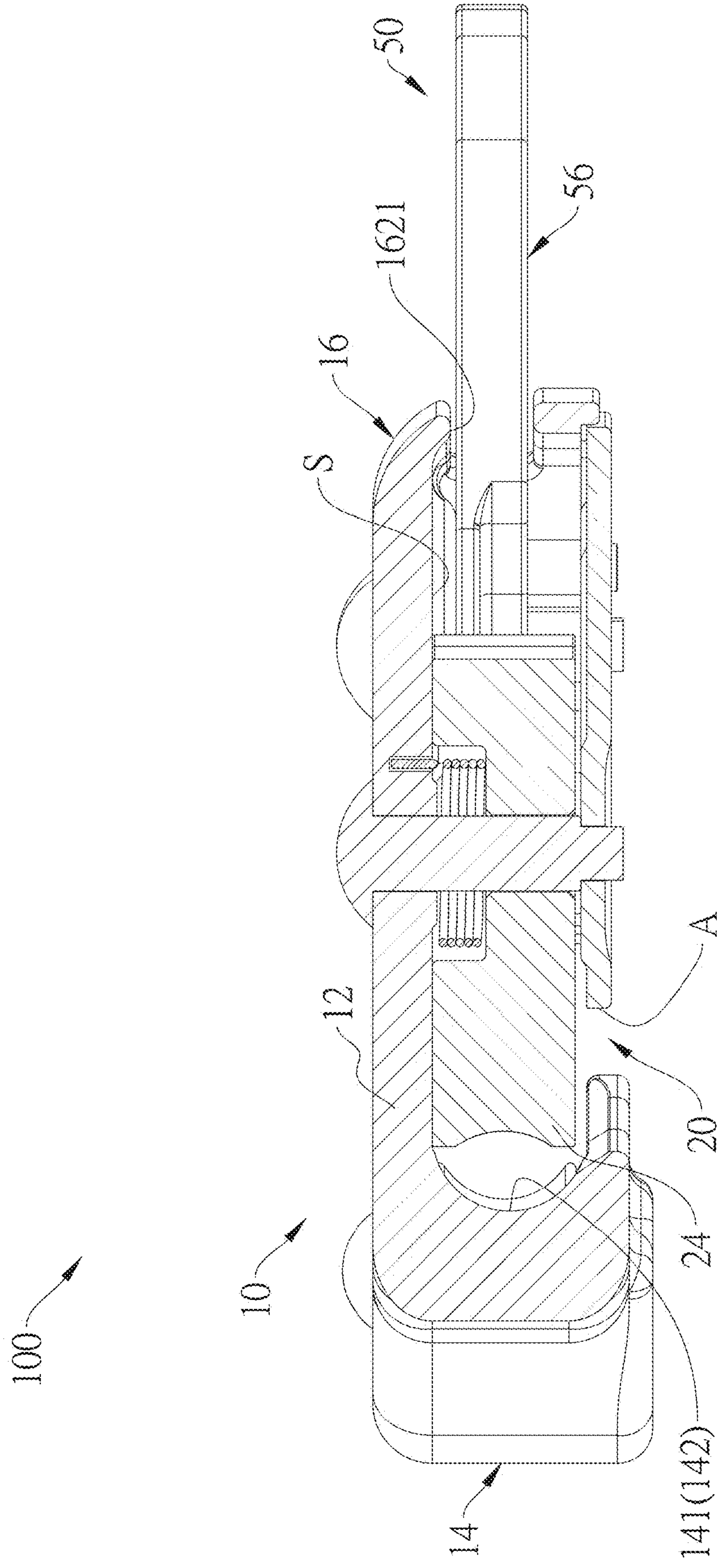
FIG. 4 is a sectional view along the 4-4 line in FIG. 3.
Figure 5:
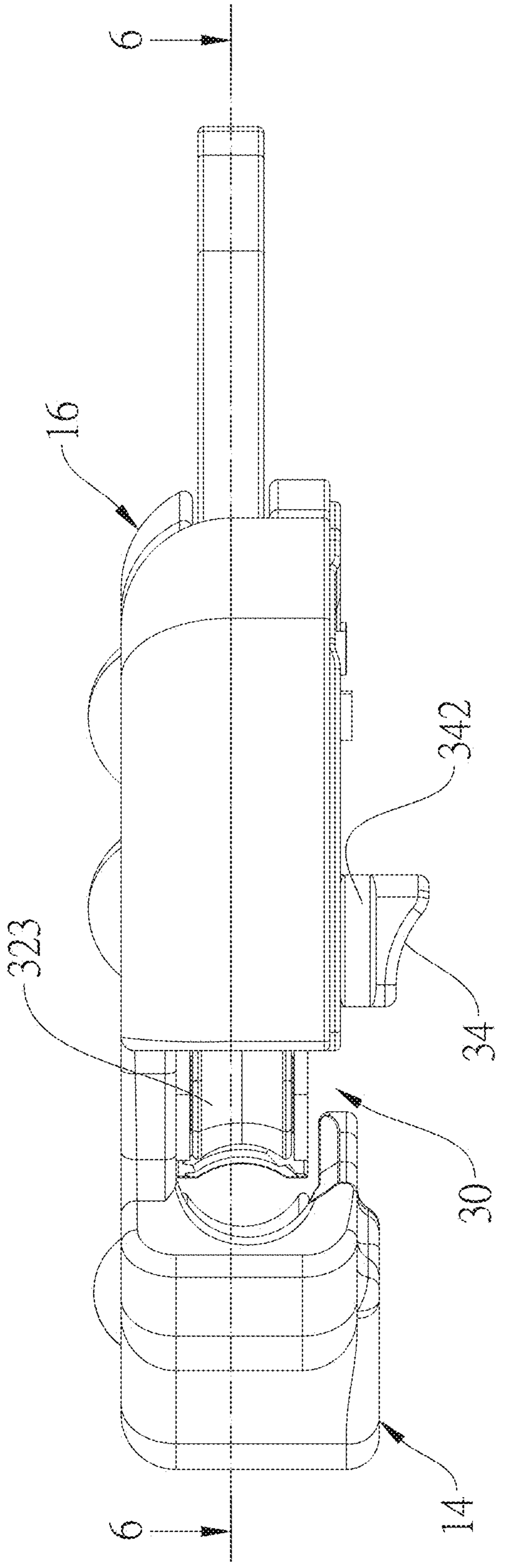
FIG. 5 is a side view of the rope grab according to the embodiment of the present invention.

Referring to FIG. 1 to FIG. 3, the housing 10 has a base plate 12, wherein two opposite sides of the base plate 12 are respectively connected to a rope seat portion 14 and an accommodating portion 16. A rope placement opening A is formed between the base plate 12, the rope seat portion 14, and the accommodating portion 16. The rope seat portion 14 has a rope groove 141, wherein the rope groove 141 is a U-shaped groove and penetrates two opposite sides of the housing 10 along a rope fastening axis L. The rope groove 141 communicates with the rope placement opening A and has a wall surface 142. The rope groove 141 has an outlet 143 and an inlet 144, wherein the outlet 143 and the inlet 144 are located at two opposite ends of the rope groove 141 along the rope fastening axis L. The rope groove 141 is adapted to accommodate a rope. A surface of the rope abuts against the wall surface 142, and the rope passes through the outlet 143 and the inlet 144. When the rope is placed in the rope groove 141 and is in a straight state, the rope fastening axis L is a central axis of the rope. A first direction L1 and a second direction L2, which are opposite directions, are defined along the rope fastening axis L corresponding to the outlet 143 and the inlet 144.

An end of the rope seat portion 14 that corresponds to the inlet 144 is connected to a closure member seat 18. The closure member seat 18 has two side plates 181 which are opposite to each other. A pair of sloping holes 182 are formed opposite each other on the two side plates 181. A side of each sloping hole 182 that is close to the accommodating portion 16 is nearer to the inlet 144 compared to another side of each sloping hole 182, and the another side of each sloping hole 182 that is far from the accommodating portion 16 is farther from the inlet 144. A closure member 19 is disposed in the closure member seat 18. The closure member 19 is a grooved wheel and has a guide rod 191 passing through an axis of the closure member 19. Two ends of the guide rod 191 pass through the two sloping holes 182, so that the closure member 19 is movable between two positions along the sloping holes 182 by gravity to open or close the inlet 144. A part of the base plate 12 that is close to the rope seat portion 14 has a rope placement notch 121, wherein the rope placement notch 121 leads to the rope placement opening A.

The accommodating portion 16 is opposite to the rope seat portion 14 across the rope placement opening A. The accommodating portion 16 has a bottom plate 161, wherein the bottom plate 161 is connected to the base plate 12. A side wall 162 is connected to a periphery of the accommodating portion 16, and a cover plate 163 is connected to the side wall 162. An assembly space S is formed between the bottom plate 161, the side wall 162, and the cover plate 163, wherein the assembly space S communicates with the rope placement opening A. The bottom plate 161 has a track 1611 and a locking member pivot seat 1612 located on a side of the bottom plate 161 corresponding to the first direction L1. The track 1611 is a straight track extending in a direction perpendicular to the rope fastening axis L. A spring seat 1613 is disposed on an end of the track 1611 that is far from the rope seat portion 14. The track 1611 is nearer to the rope seat portion 14 compared to the locking member pivot seat 1612. In the current embodiment, the locking member pivot seat 1612 is an axial rod.

Another side of the bottom plate 161 corresponding to the second direction L2 has a linkage member pivot seat 1614. A middle of the bottom plate 161 has a cam member pivot seat 1615 located between the track 1611 and the linkage member pivot seat 1614. A side of the side wall 162 that is far from the rope seat portion 14 has a linkage member through hole 1621. The cover plate 163 has a button through hole 1631 corresponding to a position of the track 1611. The button through hole 1631 is an elongated hole extending in the direction perpendicular to the rope fastening axis L. Two opposite sides of the button through hole 1631 have a first section 1632 and a second section 1633. The first section 1632 is nearer to the rope seat portion 14 compared to the second section 1633. A width of a periphery of the second section 1633 along a direction of the rope fastening axis L is less than a width of a periphery of the first section 1632 along the direction of the rope fastening axis L.

Figure 6:
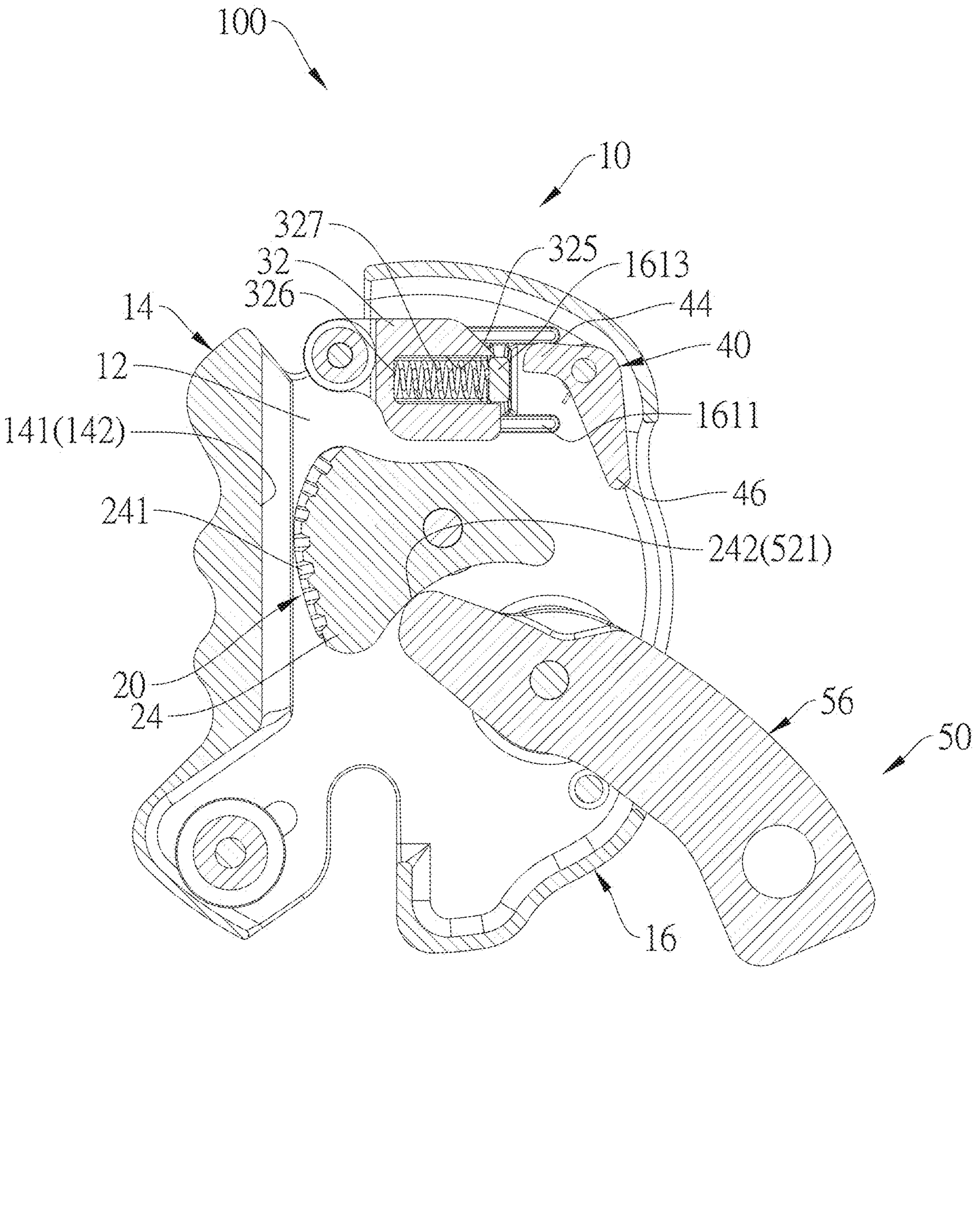
FIG. 6 is a sectional view along the 6-6 line in FIG. 5.
Figure 8:
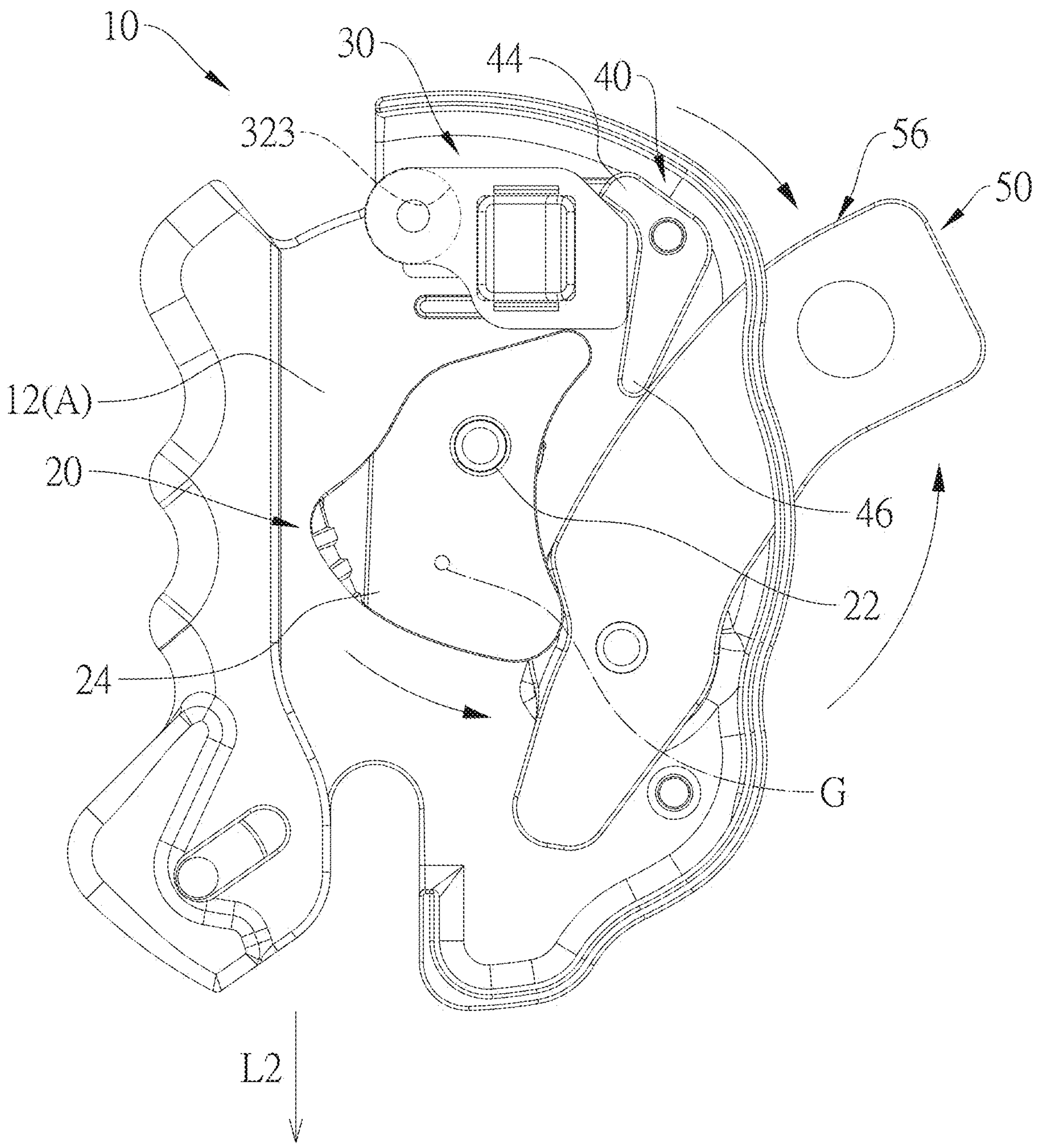
FIG. 8 is an operational schematic view showing the linkage member in FIG. 7 moved to the eighth position, the cam member moved to the second position, the locking member moved to the sixth position, and the limiting member moved to the fourth position.

Referring to FIG. 2 to FIG. 6, the cam member 20 is disposed in the assembly space S and has a cam member pivot portion 22. A side of the cam member pivot portion 22 is connected to a cam portion 24. As shown in FIG. 8, the cam member 20 has a gravity center G disposed on the cam portion 24. The cam member 20 is pivotally connected to the cam member pivot seat 1615 of the accommodating portion 16 by the cam member pivot portion 22, so that the cam member 20 could pivot between a first position and a second position. The cam member 20 is located in the first position as shown in FIG. 6, and the cam member 20 is located in the second position as shown in FIG. 8. When the cam member 20 is located in the second position, the gravity center G is located in a side of the cam portion 24 relative to the cam member pivot portion 22, facing the second direction L2 and near the rope seat portion 14. A part of the cam portion 24 extending to the rope placement opening A when the cam member 20 is located in the first position is greater than a part of the cam portion 24 extending to the rope placement opening A when the cam member 20 is located in the second position. A shortest distance between the cam portion 24 and the wall surface 142 is less than a diameter of the rope. Therefore, when the cam portion 24 of the cam member 20 is located in the first position, the cam portion 24 could together clamp the rope placed in the rope groove 141 with the wall surface 142.

Figure 7:
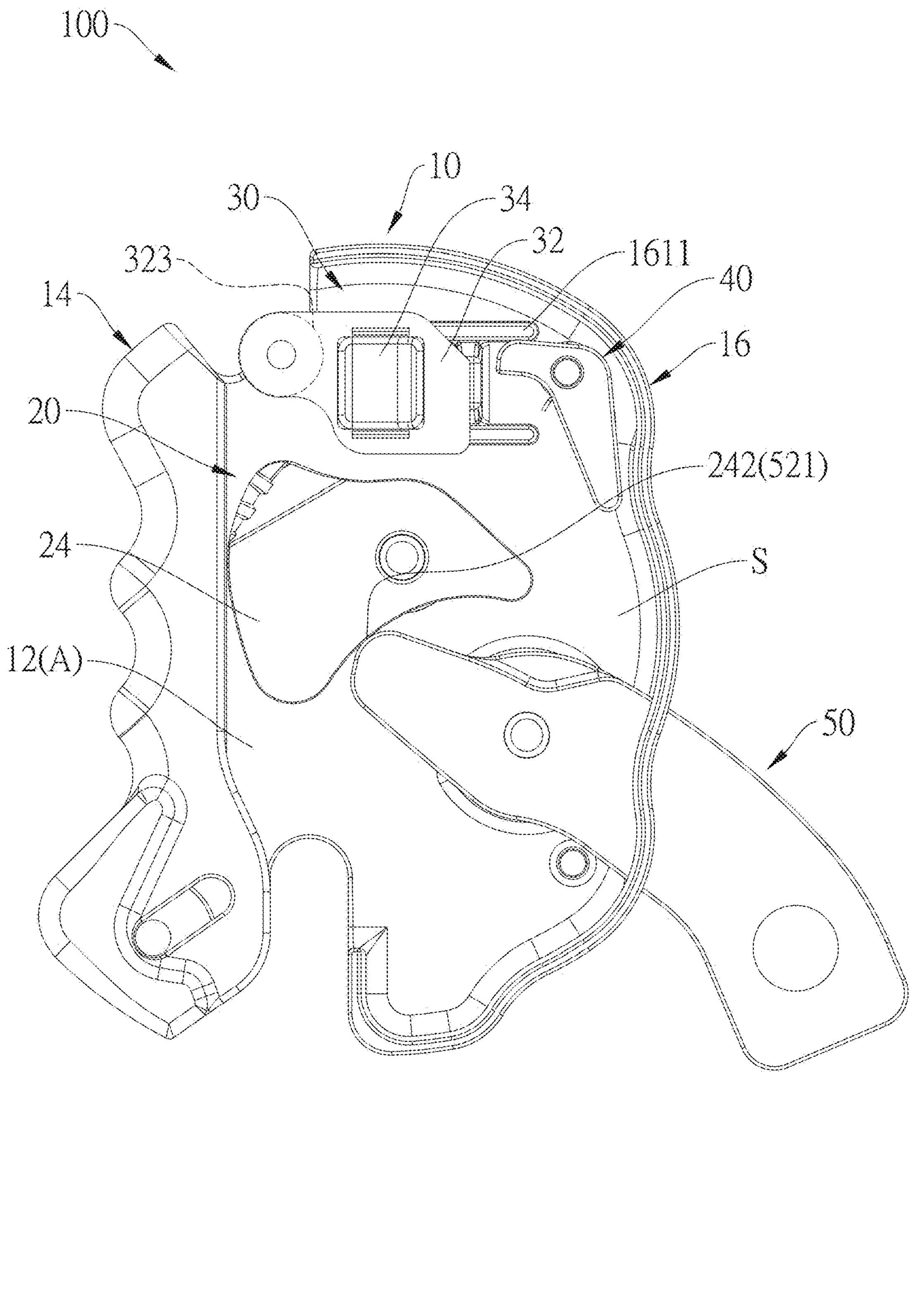
FIG. 7 is a top view showing the rope grab after removing the cover plate according to the embodiment of the present invention.

A cam member spring 26 is connected between the cam member 20 and the bottom plate 161 of the accommodating portion 16. The cam member spring 26 applies a biasing force to the cam member 20, so that the cam member 20 tends to pivot towards the first position. The biasing force has less influence on a pivoting movement of the cam member 20 compared to gravity. As shown in FIG. 3 and FIG. 6, the cam member 20 moves from the second position to the first position along a rotation direction L3. An outer surface of the cam portion 24 is a concave arc surface and has a plurality of pawls 241. As shown in FIG. 3, FIG. 7, and FIG. 8, after the cam member 20 moves from the first position to the second position, a corner of the cam portion 24 facing the rotation direction L3 still protrudes to the rope placement opening A. Additionally, a front side of the corner is a recessed shape, which does not obstruct the rope from moving through the rope placement opening A into the rope groove 141. A side of the cam portion 24 opposite to the rotation direction L3 has an abutting surface 242.

As described above, the cam member spring 26 applies the biasing force to the cam member 20, so that the cam member 20 tends to pivot towards the first position. As shown in FIG. 3, FIG. 6, FIG. 7, and FIG. 8, when the rope is positioned in the rope groove 141, even if the cam member 20 is located in the second position, the cam portion 24 of the cam member 20 would pivot slightly into the rope placement opening A due to the biasing force. When the rope moves along the rope fastening axis L relative to the housing 10 in the first direction L1, a friction between the surface of the rope and the corner of the cam portion 24, or the outer surface near the corner of the cam portion 24, drives the cam member 20 to continue pivoting toward the first position until the rope is clamped between the cam portion 24 and the wall surface 142. At this point, the housing 10 could not move relative to the rope along the rope fastening axis L in the second direction L2. Conversely, when the rope moves along the rope fastening axis L in the second direction L2, the cam portion 24 of the cam member 20 is released, and the cam member 20 pivots toward the second position. In other words, when the rope is positioned in the rope groove 141, the housing 10 could move freely along the rope fastening axis L relative to the rope in the first direction L1.

As shown in FIG. 1, FIG. 2, FIG. 3, and FIG. 6, the limiting member 30 is disposed in the assembly space S and includes a sliding block 32 and a button 34. An end of the sliding block 32 facing the rope seat portion 14 has a limiting wheel seat 321, and another end of the sliding block 32, which is away from the rope seat portion 14, has a stop portion 322. A limiting wheel 323 is rotatably connected to the limiting wheel seat 321, wherein the limiting wheel 323 is a grooved wheel. The limiting member 30 is disposed on the track 1611 of the accommodating portion 16 by the sliding block 32, so that the limiting member 30 could move back and forth relative to the rope placement opening A between a third position and a fourth position. The limiting member 30 is located in the third position as shown in FIG. 3, and the limiting member 30 is located in the fourth position as shown in FIG. 8. A side of the sliding block 32 facing the cover plate 163 has a button groove 324, and another side of the sliding block 32, which faces the track 1611, has a limiting member spring groove 325. The limiting member spring groove 325 has a closed end 326. A limiting member spring 327 is disposed in the limiting member spring groove 325. Two opposite ends of the limiting member spring 327 respectively abut against the closed end 326 and the spring seat 1613, thus pushing the limiting member 30 toward the third position.

When the limiting member 30 is located in the third position, the limiting wheel 323 is nearer to the rope groove 141 compared to when the limiting member 30 is located in the fourth position. The limiting wheel 323 is adapted to restrict the rope in the rope groove 141. The limiting wheel 323 and the wall surface 142 of the rope groove 141 could restrict the rope placed in the rope groove 141, thereby preventing the rope from coming out of the rope groove 141. Moreover, the limiting wheel 323, which is the rotatable grooved wheel and is in contact with the rope, could guide the rope to slide within the rope groove 141. In particular, when the limiting member 30 moves from the fourth position to the third position, the limiting wheel 323 protrudes toward a direction of the outlet 143 from the accommodating portion 16. Therefore, the limiting wheel 323 extends into the rope placement opening A and contacts the rope, thus restricting the rope in the rope groove 141.

As shown in FIG. 1, FIG. 2, FIG. 3, and FIG. 6, the button 34 is in the shape of a cap, and an inner side of the button 34 is accommodated in the button groove 324. An inner end of the button 34 is restricted in the button groove 324. A button spring 341 is disposed in the button groove 324. The button spring 341 is adapted to abut against the button 34, so that the button 34 protrudes through the first section 1632 of the button through hole 1631. A contour of the button 34 matches a size of the first section 1632. The button 34 has a neck portion 342 disposed around the button 34, wherein the neck portion 342 is offset from the periphery of the second section 1633 in a direction where the button 34 protrudes through the first section 1632. A width of the neck portion 342 along the direction of the rope fastening axis L is less than a width of the periphery of the second section 1633 along the direction of the rope fastening axis L. Therefore, when the limiting member 30 is located in the third position, the button 34 protruding from the first section 1632 is restricted in position and could not move within the first section 1632. The limiting member 30 could only be moved to the fourth position when a user presses the button 34, so that the neck portion 342 moves backward with the button 34 and aligns with the periphery of the second section 1633.

As shown in FIG. 2, FIG. 3, and FIG. 6, the locking member 40 is disposed in the assembly space S. The locking member 40 has a pivot hole 42 disposed on the middle of the locking member 40. The locking member 40 has a first arm 44 and a second arm 46 that are disposed around the locking member 40. The locking member 40 fits around the locking member pivot seat 1612 of the accommodating portion 16 via the pivot hole 42, so that the locking member 40 could pivot between a fifth position and a sixth position. The locking member 40 is located in the fifth position as shown in FIG. 6, and the locking member 40 is located in the sixth position as shown in FIG. 8. A locking member spring 48 is connected between the locking member 40 and the bottom plate 161 of the accommodating portion 16. When the locking member 40 rotates away from the fifth position, the locking member spring 48 is adapted to return the locking member 40 to the fifth position. The first arm 44 of the locking member 40 faces the stop portion 322 of the sliding block 32 along an extension direction of the track 1611, and the second arm 46 extends in the second direction L2. Therefore, as shown in FIG. 6 and FIG. 7, when the locking member 40 is located in the fifth position, the first arm 44 restricts the limiting member 30 from moving from the third position to the fourth position.

As shown in FIG. 1, FIG. 2, FIG. 3, and FIG. 6, the linkage member 50 is a long rod body that includes sequentially an abutting rod 52, a linkage member pivot portion 54, and a handle portion 56. The abutting rod 52 of the linkage member 50 and the linkage member pivot portion 54 protrude into the assembly space S. An end of the abutting rod 52 facing the rope seat portion 14 has an abutting end 521. An end of the handle portion 56 that is away from the rope seat portion 14 has a safety harness attachment portion 561. In the current embodiment, the safety harness attachment portion 561 is a rope-fastening hole. The linkage member 50 pivots on the linkage member pivot seat 1614 of the accommodating portion 16 via the linkage member pivot portion 54, so that the linkage member 50 could pivot between a seventh position and an eighth position. The handle portion 56 protrudes outward from the linkage member through hole 1621 of the accommodating portion 16, so that the safety harness attachment portion 561 is located outside of the accommodating portion 16 for securing a safety harness. A linkage member spring 58 is connected between the linkage member pivot portion 54 and the bottom plate 161 of the accommodating portion 16. When the linkage member 50 rotates away from the seventh position, the linkage member spring 58 is adapted to return the linkage member 50 to the seventh position.

Figure 9:
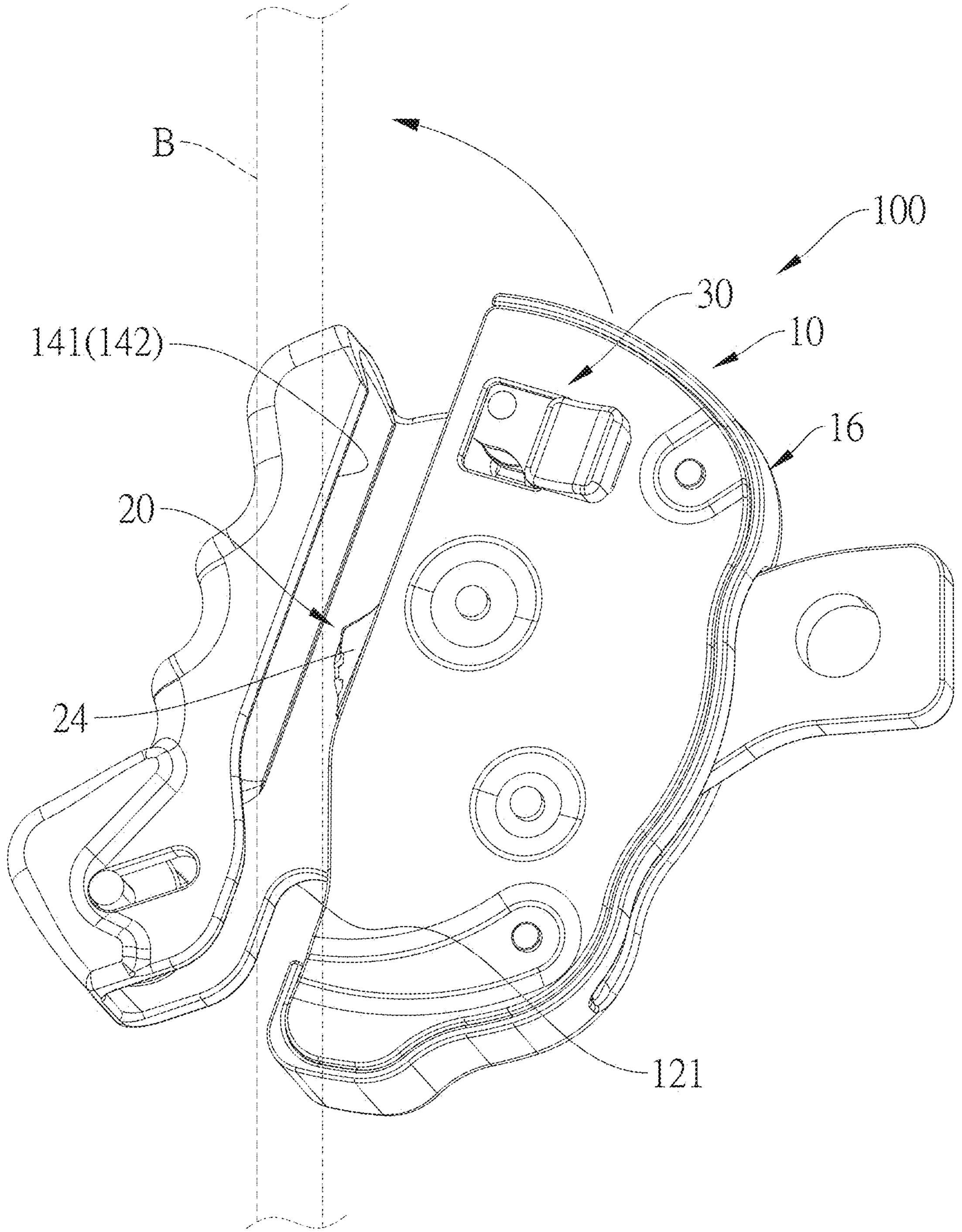
FIG. 9 is an operational schematic view showing the rope grab, according to the embodiment of the present invention, after adjusting to the state shown in FIG. 8, for setting on the rope.

As shown in FIG. 6, when the linkage member 50 is located in the seventh position, the abutting end 521 abuts against the abutting surface 242 of the cam member 20, so that the cam member 20 is limited in the first position. As shown in FIG. 8, when the linkage member 50 is located in the eighth position, the handle portion 56 moves the second arm 46 of the locking member 40, so that locking member 40 rotates clockwise and the first arm 44 pivots from the fifth position to the sixth position. Therefore, the first arm 44 rotates from the fifth position, where the first arm 44 limits the limiting member 30, to the sixth position, where the first arm 44 does not limit the limiting member 30. Therefore, the locking member 40 releases the limiting member 30, and the user could press the button 34 at this time to move the limiting member 30 to the fourth position, so that the limiting wheel 323 is moved into the accommodating portion 16. As shown in FIG. 8 and FIG. 9, by ensuring that the limiting wheel 323 no longer extends into the rope placement opening A, it prevents the limiting wheel 323 from obstructing the rope from moving from the rope placement opening A to the rope groove 141 of the rope seat portion 14.

When setting the rope grabber 100 of the present invention onto the rope, as shown in FIG. 1, FIG. 7, FIG. 8, and FIG. 9. First, attach the safety harness to the safety harness attachment portion 561 of the linkage member 50. Next, open the rope placement opening A of the housing 10 so that a rope B could enter the rope groove 141 of the rope seat portion 14 through the rope placement opening A. During the process of opening the rope placement opening A of the housing 10, the user first moves the handle portion 56 of the linkage member 50, so that the linkage member 50 rotates counterclockwise from the seventh position to the eighth position. At this point, the abutting end 521 of the linkage member 50 moves away from a position where the abutting end 521 abuts against the abutting surface 242, and the handle portion 56 moves the second arm 46 of the locking member 40.

When the abutting end 521 of the linkage member 50 no longer abuts against the abutting surface 242 of the cam member 20, the gravity center G of the cam member 20 is pulled by gravity, so that the cam member 20 rotates counterclockwise from the first position to the second position. Therefore, the cam portion 24, except for the corner of the cam portion 24 facing the rotation direction L3, moves into the assembly space S of the accommodating portion 16. When the handle portion 56 moves the second arm 46 of the locking member 40, the locking member 40 rotates clockwise from the fifth position to the sixth position. The first arm 44 of the locking member 40 pivots from the fifth position, where the first arm 44 limits the limiting member 30, to the sixth position, so that the locking member 40 releases the limiting member 30. At this point, the user could press the button 34 of the limiting member 30, so that the neck portion 342 aligns with the periphery of the second section 1633. Next, the user moves the button 34 from a position of the first section 1632 to a position of the second section 1633. At this point, the sliding block 32 moves along the track 1611 in the direction of the locking member 40, so that the limiting member 30 moves from the fifth position to the sixth position. Through the limiting wheel 323 moving with the sliding block 32 into the assembly space S of the accommodating portion 16, the rope placement opening A of the housing 10 is opened.

When the rope placement opening A of the housing 10 is opened, as shown in FIG. 8 and FIG. 9, the user holds the housing 10 and tilts the housing 10 relative to the rope B. After fitting rope placement notch 121 of the housing 10 onto the rope B, the user straightens the housing 10 so that the rope B passes through the rope placement opening A and into the rope groove 141 of the rope seat portion 14. The user then releases the button 34, as shown in FIG. 6, allowing the limiting member spring 327 to push the sliding block 32 back to the third position. As shown in FIG. 7 and FIG. 9, at this time, the limiting wheel 323 moves into the rope placement opening A and abuts against the rope B, and the locking member 40 also returns to the fifth position. This completes the operation of setting the rope grab 100 of the present invention onto the rope B.

Figure 10:
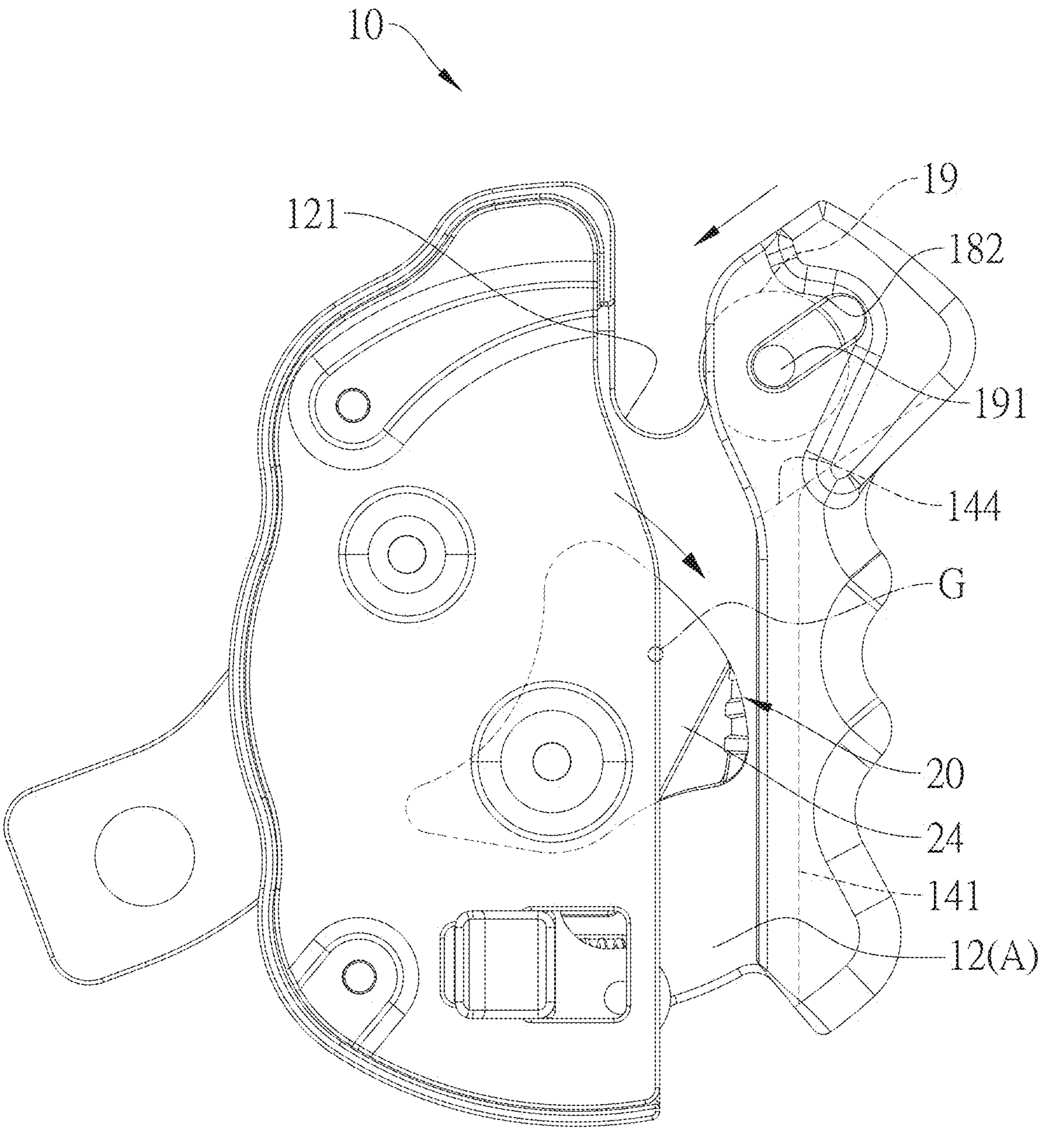
FIG. 10 is an operational schematic view showing the rope grab in the inverted position according to the embodiment of the present invention.

When using the rope grab 100 of the present invention, as shown in FIG. 3, a setup method for the housing 10 is to have the first direction L1 facing upwards and the second direction L2 facing downwards. In other words, the second direction L2 faces towards the ground. When the housing 10 is inverted, the housing 10 changes from a state shown in FIG. 8 to a state shown in FIG. 10. Since when the cam member 20 is in the second position, the gravity center G is located in the side of the cam portion 24 relative to the cam member pivot portion 22, facing the second direction L2 and near the rope seat portion 14. Therefore, when the housing 10 is inverted, the gravity center G of the cam member 20 is pulled by gravity to rotate clockwise to the first position, thus closing the rope placement opening A. Simultaneously, the closure member 19 is also pulled by gravity and slides along the sloping hole 182 via the guide rod 191 to a position where the closure member 19 closes the inlet 144. Therefore, the rope could not pass through the rope placement opening A and the inlet 144 to be placed into the rope groove 141, thus avoiding incorrect orientation of the housing 10 on the rope.

It must be pointed out that the embodiments described above are only some preferred embodiments of the present invention. All equivalent structures which employ the concepts disclosed in this specification and the appended claims should fall within the scope of the present invention.

What is claimed is:

1. A rope grab, comprising:

a housing having a rope seat portion and an accommodating portion, wherein the rope seat portion has a rope groove for accommodating a rope; the rope groove penetrates two opposite sides of the housing and has a wall surface;

a cam member pivotally connected to the accommodating portion, wherein the cam member pivots between a first position and a second position; the cam member has a cam portion; when the cam member is located in the first position, the cam member clamps the rope together with the wall surface;

a limiting member, wherein the limiting member is disposed in the accommodating portion and is movable between a third position and a fourth position; the limiting member has a limiting wheel; when the limiting member is located in the third position, the limiting wheel is nearer to the rope groove compared to when the limiting member is located in the fourth position; the limiting wheel is adapted to restrict the rope in the rope groove;

a locking member pivotally connected to the accommodating portion, wherein the locking member pivots between a fifth position and a sixth position; the locking member has a first arm and a second arm; when the locking member is located in the fifth position, the first arm restricts the limiting member from moving from the third position to the fourth position; a locking member spring is connected between the locking member and the accommodating portion; the locking member spring is adapted to return the locking member to the fifth position; and a linkage member pivotally connected to the accommodating portion, wherein the linkage member pivots between a seventh position and an eighth position; the linkage member has an abutting end and a safety harness attachment portion; when the linkage member is located in the seventh position, the abutting end abuts against the cam member that restricts the cam member in the first position; when the linkage member is located in the eighth position, the linkage member moves the second arm to move the first arm from a position that restricts the limiting member to the sixth position.

2. The rope grab as claimed in claim 1, wherein a track is formed in the accommodating portion, and the accommodating portion has a cover plate; the cover plate has a button through hole, wherein two sides of the button through hole have a first section and a second section; a width of the second section is less than a width of the first section; the limiting member has a sliding block, wherein the sliding block is movably disposed on the track; the sliding block has a button groove; a button is accommodated in the button groove; a button spring is disposed in the button groove for abutting against the button; the button protrudes through the first section; the button has a neck portion disposed around the button, wherein the neck portion is offset from a periphery of the second section; a width of the neck portion is less than a width of the periphery of the second section.

3. The rope grab as claimed in claim 2, wherein two opposite ends of the sliding block respectively comprise a limiting wheel seat and a stop portion; the limiting wheel is rotatably connected to the limiting wheel seat; the first arm of the locking member faces the stop portion along an extension direction of the track, which restricts the sliding block of the limiting member from moving from the third position to the fourth position.

4. The rope grab as claimed in claim 2, wherein the accommodating portion has a spring seat disposed on an end of the track that is far from the rope seat portion; the sliding block has a limiting member spring groove; the limiting member spring groove has a closed end; a limiting member spring is disposed in the limiting member spring groove; two ends of the limiting member spring respectively abut against the closed end and the spring seat.

5. The rope grab as claimed in claim 1, wherein two opposite ends of the rope groove have an outlet and an inlet; when the limiting member moves from the fourth position to the third position, the limiting wheel protrudes toward a direction of the outlet from the accommodating portion.

6. The rope grab as claimed in claim 5, wherein the rope groove extends in a direction of a rope fastening axis; a first direction and a second direction, which are opposite directions, are defined along the rope fastening axis corresponding to the outlet and the inlet; the cam member has a cam member pivot portion pivotally connected to the accommodating portion; the cam portion is connected to a side of the cam member pivot portion and has a gravity center; when the cam member is located in the second position, the gravity center is located in a side of the cam portion relative to the cam member pivot portion, facing the second direction and near the rope seat portion.

7. The rope grab as claimed in claim 6, wherein a cam member spring is connected between the cam member and the accommodating portion; the cam member spring applies a biasing force to the cam member, so that the cam member tends to pivot towards the first position; the biasing force has less influence on a pivoting movement of the cam member compared to gravity.

8. The rope grab as claimed in claim 5, wherein an end of the rope seat portion that corresponds to the inlet is connected to a closure member seat; the closure member seat has two side plates which are opposite to each other; a pair of sloping holes are formed opposite each other on the two side plates; a side of each sloping hole that is close to the accommodating portion is nearer to the inlet compared to another side of each sloping hole, and the another side of each sloping hole that is far from the accommodating portion is farther from the inlet; a closure member is disposed in the closure member seat; the closure member has a guide rod, wherein two ends of the guide rod pass through the two sloping holes; when the closure member is pulled by gravity to move along the two sloping holes to a position closer to the accommodating portion, the closure member closes the inlet.

9. The rope grab as claimed in claim 8, wherein the housing has a base plate; two sides of the base plate are respectively connected to the rope seat portion and the accommodating portion; a rope placement opening is formed between the base plate, the rope seat portion, and the accommodating portion; a part of the base plate that is close to the rope seat portion has a rope placement notch; at least a part of the cam portion of the cam member extends to the rope placement opening; when the limiting member is located in the third position, the limiting wheel extends to the rope placement opening.

10. The rope grab as claimed in claim 1, wherein the cam member moves from the second position to the first position along a rotation direction; a side of the cam portion opposite to the rotation direction has an abutting surface; the abutting end of the linkage member is adapted to abut against the abutting surface, so that the cam member is limited in the first position.

* * * * *